(12) United States Patent
Axe et al.

(10) Patent No.: US 10,400,648 B2
(45) Date of Patent: Sep. 3, 2019

(54) METHOD FOR CONTROLLING AN EXHAUST GAS TREATMENT SYSTEM

(71) Applicant: GM GLOBAL TECHNOLOGY OPERATIONS LLC, Detroit, MI (US)

(72) Inventors: Bryan D. Axe, Farmington Hills, MI (US); Michael A. Smith, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 59 days.

(21) Appl. No.: 15/713,999

(22) Filed: Sep. 25, 2017

(65) Prior Publication Data

US 2019/0093534 A1 Mar. 28, 2019

(51) Int. Cl.
*F01N 3/20* (2006.01)

(52) U.S. Cl.
CPC .......... *F01N 3/208* (2013.01); *F01N 2260/00* (2013.01); *F01N 2610/02* (2013.01); *F01N 2610/144* (2013.01); *F01N 2610/146* (2013.01); *F01N 2900/08* (2013.01); *F01N 2900/10* (2013.01); *F01N 2900/1812* (2013.01); *F01N 2900/1821* (2013.01)

(58) Field of Classification Search
CPC combination set(s) only.
See application file for complete search history.

(56) References Cited

U.S. PATENT DOCUMENTS

| 10,107,217 | B2* | 10/2018 | Glugla | F02D 41/0087 |
|---|---|---|---|---|
| 2010/0312454 | A1* | 12/2010 | Nada | F02D 41/403 701/103 |
| 2013/0074475 | A1* | 3/2013 | Inoue | B01D 53/9477 60/274 |
| 2013/0284145 | A1* | 10/2013 | Surnilla | F02D 35/027 123/25 C |
| 2014/0034013 | A1* | 2/2014 | Leone | F02D 35/027 123/406.47 |
| 2017/0298850 | A1* | 10/2017 | Kurtz | F01N 11/007 |
| 2017/0328251 | A1* | 11/2017 | Ratan | F01N 3/208 |

\* cited by examiner

*Primary Examiner* — Binh Q Tran

(57) ABSTRACT

Provided is a method for controlling a vehicle exhaust gas treatment system, wherein the system includes an engine and a selective catalytic reduction device configured to receive exhaust gas from the engine and reductant from an injector. The method comprises determining a need for a reductant injection, determining a need for reductant injector noise abatement, and subsequently conducting one or more reductant injection events during one or more engine combustion events. A vehicle combustion event comprises combustion of fuel within a cylinder of the ICE. Determining a need for reductant injector noise abatement comprises determining if an engine speed is below a threshold, if a speed of the vehicle is below a threshold, if a decibel level of a vehicle audio system is below a threshold, or if a hands-free telephone system is being utilized by a passenger of the vehicle. The engine can be a diesel engine.

17 Claims, 3 Drawing Sheets

METHOD FOR CONTROLLING AN EXHAUST GAS TREATMENT SYSTEM

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons and oxides of nitrogen ($NO_x$) as well as condensed phase materials (liquids and solids) that constitute particulate matter. Reduction of $NO_X$ emissions from an exhaust feed stream containing excess oxygen is a challenge for vehicle manufacturers.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction device (SCR), which generally includes a substrate or support with a catalyst compound disposed thereon. Passing exhaust over the catalyst converts certain or all exhaust constituents in desired compounds, such as non-regulated exhaust gas components. A reductant is typically injected into or upstream from the SCR, decomposed into ammonia, and absorbed by the SCR. The ammonia then reduces the $NO_x$ to nitrogen and water in the presence of the SCR catalyst.

SUMMARY

Methods for reducing noise in a vehicle are provided. The vehicle can include an internal combustion engine (ICE) which communicates exhaust gas to a selective catalytic reduction device (SCR) configured to receive reductant from an injector. The methods can include conducting one or more reductant injection events during one or more ICE combustion events, wherein a vehicle combustion event comprises combustion of fuel within a cylinder of the ICE. The one or more reductant injection events can be an injector noise event. The injector noise event can be an injector closing. The one or more combustion events can each occur during a power stroke of a piston with the cylinder of the ICE. The ICE can include a cylinder having a piston disposed to reciprocate within the cylinder via rotation of a crankshaft, and the one or more combustion events can each occur in the first 60 degrees of rotation of the crankshaft during a power stroke of the piston. The ICE can be a diesel ICE.

Methods for controlling an exhaust gas treatment system of a vehicle are provided. The exhaust gas treatment system can include an internal combustion engine (ICE) and a selective catalytic reduction device (SCR) configured to receive exhaust gas from the ICE and reductant from an injector. The methods can include determining a need for a reductant injection into the exhaust gas treatment system, determining a need for reductant injector noise abatement, and subsequently conducting one or more reductant injection events during one or more ICE combustion events, wherein a vehicle combustion event comprises combustion of fuel within a cylinder of the ICE. Determining a need for reductant injector noise abatement can include determining if an ICE speed is below a threshold. Determining a need for reductant injector noise abatement can include determining if a speed of the vehicle is below a threshold. Determining a need for reductant injector noise abatement can include determining if a decibel level of a vehicle audio system is below a threshold. Determining a need for reductant injector noise abatement can include determining if a hands-free telephone system is being utilized by a passenger of the vehicle. The ICE can be a diesel ICE. The one or more reductant injection events can be an injector noise event. The injector noise event can be an injector closing and/or opening. The one or more combustion events can each occur during a power stroke of a piston with the cylinder of the ICE. The ICE can include a cylinder having a piston disposed to reciprocate within the cylinder via rotation of a crankshaft, and the one or more combustion events can each occur in the first 60 degrees of rotation of the crankshaft during a power stroke of the piston.

Other objects, advantages and novel features of the exemplary embodiments will become more apparent from the following detailed description of exemplary embodiments and the accompanying drawings.

DETAILED DESCRIPTION

Figure 1:
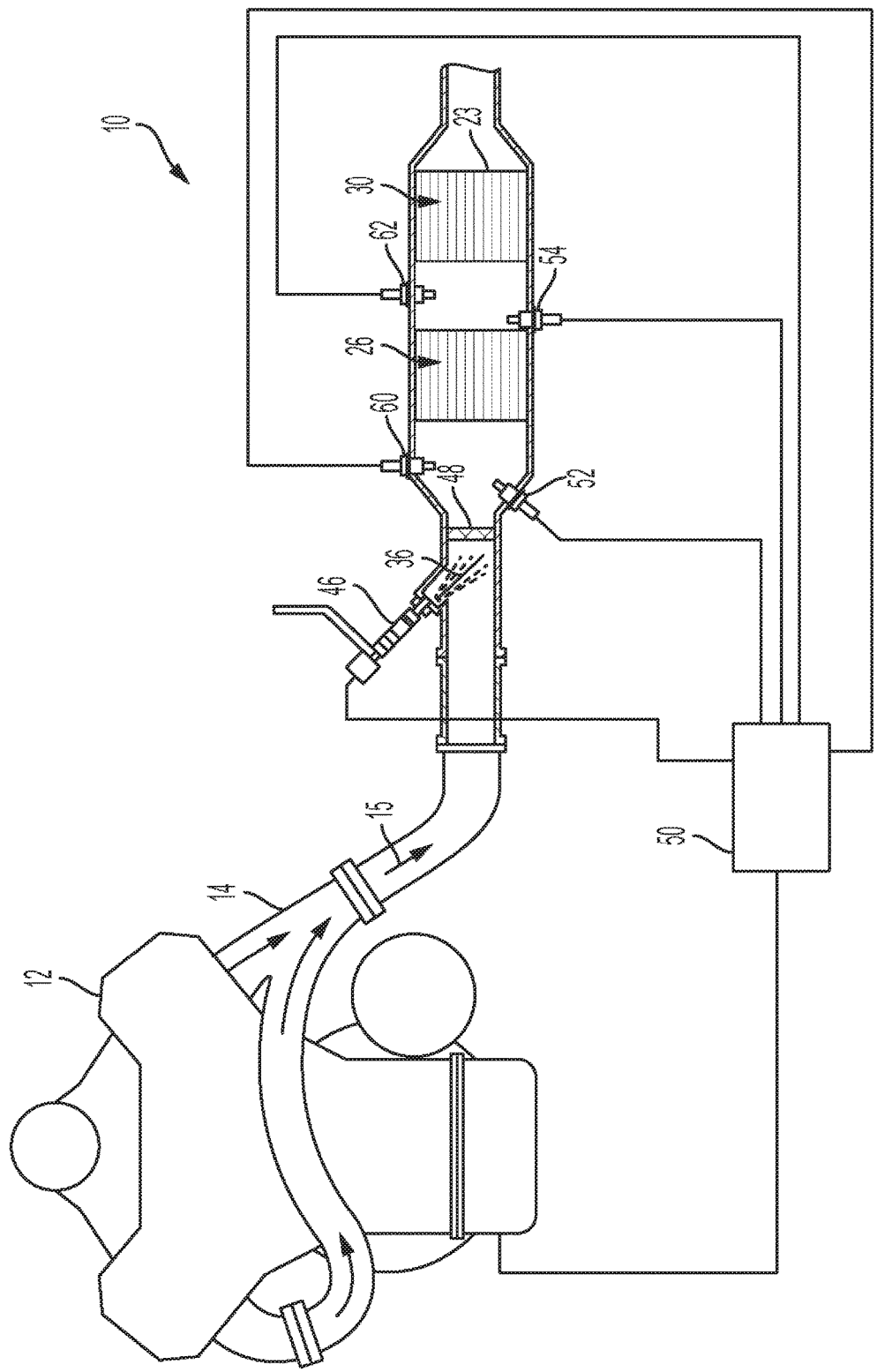
FIG. 1 shows a schematic for an exhaust gas treatment system, according to one or more embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Selective catalytic reduction devices (SCR) are commonly utilized to treat exhaust gas for vehicles powered by ICEs, and require regular injections of reductant. Reductant injectors can be noisy and detrimentally impact the experience of a passenger riding in a vehicle. The embodiments herein minimize noise caused by reductant injection without unsuitably compromising the performance of an SCR.

Referring now to FIG. 1A, an exemplary embodiment is directed to an exhaust gas treatment system 10, for the reduction of regulated exhaust gas constituents of an ICE 12. The exhaust gas treatment system 10 described herein can be implemented in various ICE systems that can include, but are not limited to, diesel engine systems, gasoline direct injection systems, and homogeneous charge compression ignition engine systems. The engines will be described herein for use in generating torque for vehicles, yet other non-vehicular applications are within the scope of this disclosure. Therefore when reference is made to a vehicle, such disclosure should be interpreted as applicable to any application of an ICE. Moreover, ICE 12 can generally represent any device capable of generating an exhaust gas 15 stream comprising $NO_x$ species, and the disclosure herein should accordingly be interpreted as applicable to all such devices. It should be further understood that the embodiments disclosed herein may be applicable to treatment of effluent streams not comprising $NO_x$ species, and, in such instances, ICE 12 can also generally represent any device capable of generating an effluent stream comprising not comprising $NO_X$ species.

The exhaust gas treatment system 10 generally includes one or more exhaust gas conduits 14, and one or more exhaust treatment devices. The exhaust gas conduit 14, which can comprise several segments, transports exhaust gas 15 from the ICE 12 to the various exhaust treatment devices of the exhaust gas treatment system 10. In some exemplary embodiments, exhaust gas 15 can comprise $NO_x$ species. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

In the embodiment as illustrated, the exhaust gas treatment system 10 devices include a SCR 26, and a particulate filter (PF) 30. The implementation shown provides the PF 30 in a common housing with the SCR catalyst 124, yet this implementation is optional and implementations providing discrete housings for the SCR catalyst 124 and PF 30 are suitable. In some embodiments, SCR 26 can comprises a selective catalytic reduction filter device (SCRF) which generally incorporates aspects of both SCRs and PFs into a single device wherein the catalytic elements of an SCR are applied to a filter substrate.

As can be appreciated, the exhaust gas treatment system 10 of the present disclosure can include various combinations of one or more of the exhaust treatment devices shown in FIG. 1A, and/or other exhaust treatment devices (not shown), and is not limited to the present example. For example, the exhaust gas treatment system 10 can optionally include an oxidation catalyst device (not shown), a flow-through container of absorbent particles (not shown), an electrically heated catalyst (EHC) device (not shown), and combinations thereof. Exhaust gas treatment system 10 can further include a control module 50 operably connected via a number of sensors to monitor the ICE 12 and/or the exhaust gas treatment system 10. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

SCR 26 can be disposed downstream of the ICE 12. In general, the SCR 26 includes all devices which utilize a reductant 36 and a catalyst to convert $NO_X$ (e.g., NO and $NO_2$) to harmless components. SCR 26 can include, for example, a flow-through ceramic or metal monolith substrate that can be packaged in a stainless steel shell or canister having an inlet and an outlet in fluid communication with the exhaust gas conduit 14. The substrate can include a SCR catalyst composition applied thereto. The SCR catalyst composition is generally a porous and high surface area material which can operate efficiently to convert $NO_x$ constituents in the exhaust gas 15 in the presence of a reductant 36, such as ammonia. For example, the catalyst composition can contain a zeolite and one or more base metal components such as iron (Fe), cobalt (Co), copper (Cu) or vanadium (V), sodium (Na), barium (Ba), titanium (Ti), tungsten (W), copper (Cu), and combinations thereof. In some embodiments the zeolite can be a β-type zeolite, a Y-type zeolite, a ZM5 zeolite, or any other crystalline zeolite structure such as a Chabazite or a USY (ultra-stable Y-type) zeolite. Suitable SCR catalyst compositions can have high thermal structural stability when used in tandem with PF 30 which are regenerated via high temperature exhaust soot burning.

The SCR catalyst composition can be washcoated onto a substrate body that is housed within a canister that fluidly communicates with the exhaust gas conduit 14 and optionally other exhaust treatment devices. The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 15. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel.

The SCR 26 generally uses a reductant 36 to reduce $NO_x$ species (e.g., NO and $NO_2$) to harmless components. Harmless components include one or more of species which are not $NO_x$ species, diatomic nitrogen, nitrogen-containing inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$). Additionally or alternatively, the reductant 36 can be any compound capable of decomposing or reacting in the presence of exhaust gas 15 to form ammonia. Equations (1)-(5) provide exemplary chemical reactions for $NO_x$ reduction involving ammonia.

$$6NO+4NH_3 \rightarrow 5N_2+6H_2O \tag{1}$$

$$4NO+4NH_3+O_2 \rightarrow 4N_2+6H_2O \tag{2}$$

$$6NO_2+8NH_3 \rightarrow 7N_2+12H_2O \tag{3}$$

$$2NO_2+4NH_3+O_2 \rightarrow 3N_2+6H_2O \tag{4}$$

$$NO+NO_2+2NH_3 \rightarrow 2N_2+3H_2O \tag{5}$$

It should be appreciated that Equations (1)-(5) are merely illustrative, and are not meant to confine the SCR 26 to a particular $NO_x$ reduction mechanism or mechanisms, nor preclude the operation of other mechanisms. The SCR 26 can be configured to perform any one of the above $NO_x$ reduction reactions, combinations of the above $NO_x$ reduction reactions, and other $NO_x$ reduction reactions.

The reductant 36 can be diluted with water in various implementations. In implementations where the reductant 36 is diluted with water, heat (e.g., from the exhaust) evaporates the water, and ammonia is supplied to the SCR 26. Non-ammonia reductants can be used as a full or partial alternative to ammonia as desired. In implementations where the reductant 36 includes urea, the urea reacts with the exhaust to produce ammonia, and ammonia is supplied to the SCR 26. The SCR 26 can store (i.e., absorb, and/or adsorb) ammonia supplied by the reductant 36 for interaction with exhaust gas 15. Equation (6) below provides an exemplary chemical reaction of ammonia production via urea decomposition.

$$CO(NH_2)_2 + H_2O \rightarrow 2NH_3 + CO_2 \qquad (6)$$

It should be appreciated that Equation (6) is merely illustrative, and is not meant to confine the urea or other reductant 36 decomposition to a particular single mechanism, nor preclude the operation of other mechanisms.

A reductant 36 can be supplied from a reductant supply source (not shown) and injected into the exhaust gas conduit 14 at a location upstream of the SCR 26 using an injector 46, or other suitable method of delivery of the reductant 36 to the exhaust gas 15. The reductant 36 can be in the form of a gas, a liquid, or an aqueous solution, such as an aqueous urea solution. The reductant 36 can be mixed with air in the injector 46 to aid in the dispersion of the injected spray. A mixer or turbulator 48 can also be disposed within the exhaust gas conduit 14 in close proximity to the injector 46 to further assist in thorough mixing of the reductant 36 with the exhaust gas 15 and/or even distribution throughout the SCR 26.

The control module 50 is operably connected to the ICE 12 and the reductant injector 46. The control module 50 can further be operably connected to the optional exhaust treatment devices described above. FIG. 1 illustrates the control module 50 in communication with two temperature sensors 52 and 54 located in the exhaust gas conduit 14. The first temperature sensor 52 is located upstream of the SCR 26, and the second temperature sensor 54 is located downstream of the SCR 26. The temperature sensors 52 and 54 send electrical signals to the control module 50 that each indicate the temperature in the exhaust gas conduit 14 in specific locations. The control module 50 is also in communication with two $NO_x$ sensors 60 and 62 that are in fluid communication with the exhaust gas conduit 14. Specifically, the first upstream $NO_x$ sensor 60 is located downstream of the ICE 12 and upstream of the SCR 26 to detect a $NO_x$ concentration level. The second downstream $NO_x$ sensor 62 is located downstream of the SCR 26 to detect the $NO_x$ concentration level in the exhaust gas conduit 14 in specific locations. In all such embodiments, the SCR 26 can comprise a SCRF device 40.

The precise amount of injected mass of reductant 36 and injection frequency are critical factors in maintaining desired exhaust gas 15 emission levels (e.g., $NO_x$ concentration). A reductant 36 injection dosing rate (e.g., grams per second) and frequency (e.g., doses per unit time) can be determined by one or more criteria such as $NO_x$ concentration upstream of a SCR 26, $NO_x$ concentration downstream of a SCR 26, downstream ammonia concentration, downstream temperature, torque output of ICE 12, exhaust flow rate, exhaust pressure, ICE 12 speed (e.g., rpm), ICE 12 air intake, other suitable criteria, and combinations thereof. For example, upstream $NO_x$ sensor 60 can measure $NO_x$ in the exhaust at a location upstream of the SCR. For example only, the upstream $NO_x$ sensor 60 can measure a mass flowrate of $NO_x$ (e.g., grams per second), a concentration of $NO_x$ (e.g., parts per million), or another suitable measure of the amount of $NO_x$. In this example, the upstream $NO_x$ concentration can be used to determine a suitable reductant 36 injection dosing rate and/or frequency. Additionally or alternatively, the reductant 36 dosing rate and/or frequency can be determined based upon temperature of the exhaust gas 15 or other exhaust gas treatment system 10 components such as the SCR 26 catalyst temperature. For example, temperature sensor 54 can measure temperature of the exhaust downstream of the SCR 26a. The temperature sensor 54 can generate a temperature signal based on the temperature of the exhaust downstream of the SCR 26 and communicate the same to control module 50.

Figure 2:
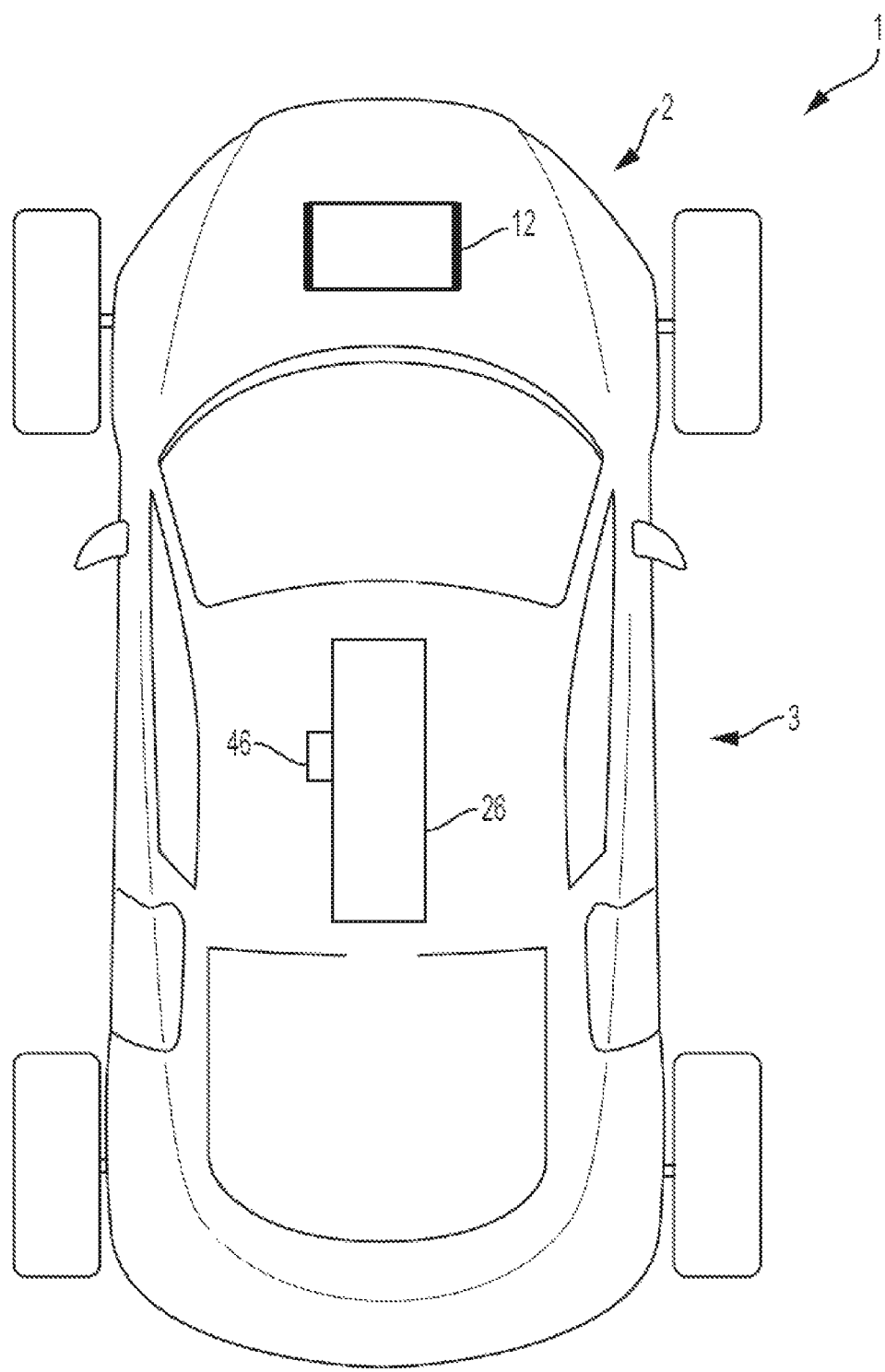
FIG. 2 illustrates a vehicle, according to one or more embodiments.

In general, a reductant 36 dosing rate can be continuously determined by the control module 50 using one or more criteria, such as the criteria described above. During reductant 36 injection, injector 46 can create undesirable noise from the mechanical movement of injector 46 components. During operation, an injector will open to allow injection, and subsequently close when injection is complete. Some injectors 46 are particularly noisy during injector opening and/or closing events, for example. A noise event can be particular to a given injector 46. FIG. 2 illustrates a schematic view of a vehicle 1 powered by ICE 12. Per the description of exhaust gas treatment system 10, ICE 12 communicates exhaust gas to SCR 26. Injector noise can be exacerbated, for example from the perspective of a passenger in a vehicle cabin, when the injector 46 is located outside of vehicle noise abatement zones (e.g., a sound-insulated ICE compartment 2). Injectors 46 which are located under the vehicle body (e.g., directly under the passenger cabin 3 of a vehicle), as shown, typically are outside of vehicle noise abatement zones.

Figure 3:
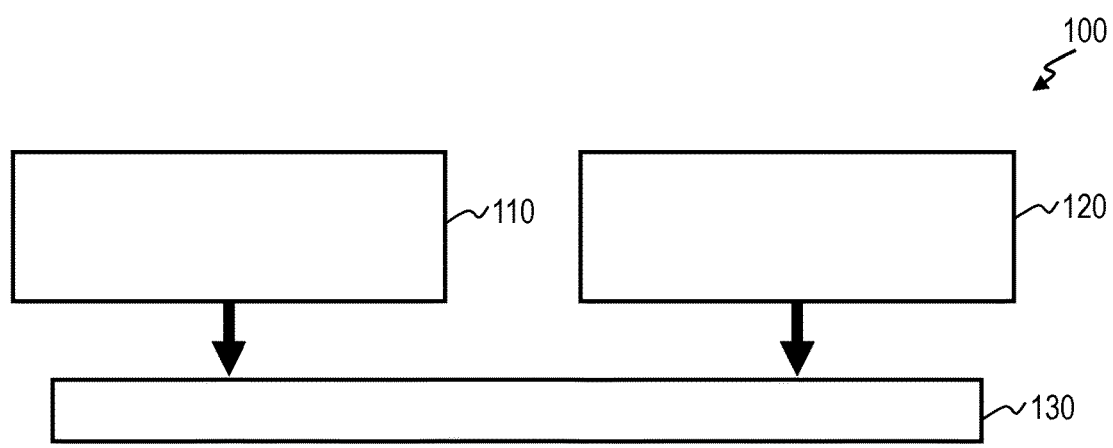
FIG. 3 illustrates a method for reducing vehicle noise, according to one or more embodiments.

Accordingly, methods for reducing vehicle 1 noise caused by reductant 36 injection are provided. FIG. 3 illustrates a method 100 for reducing vehicle 1 noise, comprising conducting 130 one or more reductant 36 injection events during one or more ICE 12 power stroke during a vehicle operating period. An injection event can comprise opening the injector 46, subsequently injecting reductant 36 via the injector 46, and closing the injector 46. In some embodiments, the injection event comprises an injector 46 noise event. An injector noise event comprises one or more portions during the injection event which generate the greatest amount of noise. In one embodiment, an injector noise event comprises an injector closing and/or opening. More particularly, method 100 comprises conducting 130 one or more reductant 36 injection events during one or more ICE 12 combustion events. The method reduces noise while maintaining suitable SCR 26 performance. Noise reduction can be determined from the point of view of a passenger within a vehicle 1 passenger cabin 3, for example. A combustion event generally includes fuel ignition within an ICE 12 cylinder (not shown), while the piston head (not shown) is proximate a top dead center position. For example, during operation of a four-stroke ICE, a cylinder is filled with fuel and air during an induction stroke, the fuel and air is compressed during a compression stroke (at the end of which the piston head nears a top dead center position), fuel is combusted during the power stroke, and exhaust is expelled from the cylinder during the exhaust stroke.

Each of the four strokes define a movement of the piston head within the cylinder, and each occur for 180 degrees of rotation of a crank shaft to which the piston is attached (i.e., each stroke occurs every two complete, 360 degree rotations of the crankshaft). In general, the temporal frequency and duration of ICE 12 combustion events can be determined based on the ICE 12 speed, which is generally defined as a rate of revolution of the crankshaft in rotations per minute (rpm). A combustion event, which occurs during the power stroke, will occur (rpm/60)/2 times per second and the power stroke will last 1/[4*(rpm/60)/2] seconds. For example, if ICE 12 is operating at 600 rpms, a cylinder will experience 5 combustion events per second, and each power stroke will last 0.05 seconds. The duration of the combustion event can vary based on the physical design of ICE 12 and the fuel and air injection strategy. Generally, the combustion event occurs during the initial portion of the power stroke. For example, during the 180 degree crankshaft rotation duration of the power stroke, the combustion even occurs during the first 30 to 60 degrees. In such an example, the combustion event duration is about 0.008 seconds to about 0.017 seconds.

Method 100 can optionally first include determining 110 a need for a reductant 36 injection into the exhaust gas treatment system 10 and/or determining 120 a need for reductant injector noise abatement prior to conducting 130 one or more reductant 36 injection events during one or more ICE 12 combustion events. No order is imposed between determining 110 and determining 120. Determining 110 a need for reductant 36 injection can comprise the methods described above. Reductant injections generally occur at a much lower rate than combustion events. For example, a 6-cylinder ICE operating at about 930 rpm may experience about 111 combustion events during a 2.5 second period, and the appurtenant exhaust gas treatment system may command about 9 discrete reductant injections. Determining 120 a need for reductant injector noise abatement generally comprises determining if noise appurtenant to various aspects of a vehicle exceeds a threshold such that undesired noise caused by injector 46 is not appreciably audible. In one embodiment, determining 120 a need for reductant injector noise abatement comprises determining if the ICE 12 speed is below a threshold. A speed threshold can be determined based on the characteristics of ICE 12, the passenger cabin 3 sound insulation, and other factors. An ICE 12 speed threshold can be 1,500 rpm, for example. In one embodiment, determining 120 a need for reductant injector noise abatement comprises determining if the vehicle speed is below a threshold. A speed threshold can be determined based on the characteristics of ICE 12, the passenger cabin 3 sound insulation, and other factors. A vehicle 1 speed threshold can be 35 miles per hour, for example. In one embodiment, determining 120 a need for reductant injector noise abatement comprises determining if the decibel level of a vehicle audio system (e.g., a radio) is below a threshold. In one embodiment, determining 120 a need for reductant injector noise abatement comprises determining if a hands-free telephone system is being utilized by a passenger of the vehicle 1.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling an exhaust gas treatment system of a vehicle, wherein the exhaust gas treatment system includes an internal combustion engine (ICE) and a selective catalytic reduction device (SCR) configured to receive exhaust gas from the ICE and reductant from an injector, the method comprising:
    determining a need for a reductant injection into the exhaust gas treatment system;
    determining a need for reductant injector noise abatement, wherein determining the need for reductant injector noise abatement comprises determining if a decibel level of a vehicle audio system is below a threshold; and
    subsequently conducting one or more reductant injection events during one or more ICE combustion events, wherein a vehicle combustion event comprises combustion of fuel within a cylinder of the ICE.

2. The method of claim 1, wherein determining the need for reductant injector noise abatement further comprises determining if an ICE speed is below a threshold.

3. The method of claim 1, wherein determining the need for reductant injector noise abatement further comprises determining if a speed of the vehicle is below a threshold.

4. The method of claim 1, wherein determining the need for reductant injector noise abatement further comprises determining if a hands-free telephone system is being utilized by a passenger of the vehicle.

5. The method of claim 1, wherein the ICE comprises a diesel ICE.

6. The method of claim 1, wherein the one or more reductant injection events comprise an injector noise event.

7. The method of claim 6, wherein the injector noise event comprises an injector closing and/or opening.

8. The method of claim 1, wherein the one or more combustion events each occur during a power stroke of a piston with the cylinder of the ICE.

9. The method of claim 1, wherein the ICE comprises a cylinder having a piston disposed to reciprocate within the cylinder via rotation of a crankshaft, and the one or more combustion events each occur in the first 60 degrees of rotation of the crankshaft during a power stroke of the piston.

10. A method for controlling an exhaust gas treatment system of a vehicle, wherein the exhaust gas treatment system includes an internal combustion engine (ICE) and a selective catalytic reduction device (SCR) configured to receive exhaust gas from the ICE and reductant from an injector, the method comprising:
    determining a need for a reductant injection into the exhaust gas treatment system;
    determining a need for reductant injector noise abatement, wherein determining the need for reductant injector noise abatement comprises determining if a hands-free telephone system is being utilized by a passenger of the vehicle; and
    subsequently conducting one or more reductant injection events during one or more ICE combustion events, wherein a vehicle combustion event comprises combustion of fuel within a cylinder of the ICE.

11. The method of claim 10, wherein determining the need for reductant injector noise abatement further comprises determining if an ICE speed is below a threshold.

12. The method of claim 10, wherein determining the need for reductant injector noise abatement further comprises determining if a speed of the vehicle is below a threshold.

13. The method of claim 10, wherein the ICE comprises a diesel ICE.

14. The method of claim 10, wherein the one or more reductant injection events comprise an injector noise event.

15. The method of claim 14, wherein the injector noise event comprises an injector closing and/or opening.

16. The method of claim 10, wherein the one or more combustion events each occur during a power stroke of a piston with the cylinder of the ICE.

17. The method of claim 10, wherein the ICE comprises a cylinder having a piston disposed to reciprocate within the cylinder via rotation of a crankshaft, and the one or more combustion events each occur in the first 60 degrees of rotation of the crankshaft during a power stroke of the piston.

\* \* \* \* \*